United States Patent
Miyabayashi et al.

(10) Patent No.: US 11,889,037 B2
(45) Date of Patent: Jan. 30, 2024

(54) PRINTER WITH LOW-POWER MODE

(71) Applicant: BROTHER KOGYO KABUSHIKI KAISHA, Nagoya (JP)

(72) Inventors: Hirokazu Miyabayashi, Nagoya (JP); Takuji Sakabe, Chita (JP); Yuki Hiramatsu, Nukata (JP); Hiromasa Takahashi, Gamagori (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/935,070

(22) Filed: Sep. 23, 2022

(65) Prior Publication Data

US 2023/0102154 A1 Mar. 30, 2023

(30) Foreign Application Priority Data

Sep. 28, 2021 (JP) ................................ 2021-157870

(51) Int. Cl.
*H04N 1/00* (2006.01)

(52) U.S. Cl.
CPC ..... *H04N 1/00896* (2013.01); *H04N 1/00891* (2013.01)

(58) Field of Classification Search
None
See application file for complete search history.

(56) References Cited

U.S. PATENT DOCUMENTS

| | | | |
|---|---|---|---|
| 2013/0007314 A1* | 1/2013 | Tung | G06F 1/12 710/51 |
| 2013/0009811 A1* | 1/2013 | van Diggelen | G01S 19/34 342/357.74 |
| 2016/0352949 A1* | 12/2016 | Niimura | G06F 1/3228 |
| 2017/0017587 A1* | 1/2017 | West | G06F 13/4068 |
| 2018/0159553 A1* | 6/2018 | Sharon | H03M 13/1137 |
| 2021/0294373 A1* | 9/2021 | Toosizadeh | G06F 1/305 |

FOREIGN PATENT DOCUMENTS

| JP | 2015-85528 A | 5/2015 |
|---|---|---|
| JP | 2015085528 A * | 5/2015 |

* cited by examiner

*Primary Examiner* — Miya J Cato
*Assistant Examiner* — Pawan Dhingra
(74) *Attorney, Agent, or Firm* — KENEALY VAIDYA LLP

(57) ABSTRACT

A printer includes a printing unit powered from a battery which is charged by a charge IC, and a processor. The processor sets a mode of the printer to a print mode, and sets the mode to a low-power mode in which total power consumption of the printer is lower than that in the print mode, in a state that the printing unit stops printing. In a case where the processor sets the mode to the low-power mode, the processor sets the mode to a first low-power mode, in which the charge IC is driven at a first SW frequency, when the charge IC works to charge the battery, and sets the mode to a second low-power mode, in which the charge IC is driven at a second SW frequency lower than the first SW frequency, when the charge IC stops the charge of the battery.

8 Claims, 6 Drawing Sheets

PRINTER WITH LOW-POWER MODE

REFERENCE TO RELATED APPLICATIONS

This application claims priority from Japanese Patent Application No. 2021-157870 filed on Sep. 28, 2021. The entire content of the priority application is incorporated herein by reference.

BACKGROUND ART

A printer, which is configured to switch a mode between a normal mode and a low-power mode, is known. The low-power mode is a mode in which total power consumption of the printer is lower than that in the normal mode.

The printer may consume more power than necessary in the low-power mode.

DESCRIPTION

An object of the present disclosure is to provide a printer capable of power saving.

An aspect of the present disclosure is a printer including: a printing unit configured to be driven by a power supply from a battery which is charged by a charge IC; and a processor configured to: set a mode of the printer to a print mode in which the printing unit executes printing; and set the mode of the printer to a low-power mode in which total power consumption of the printer is lower than that in the print mode, in a state that the printing unit stops printing, in which in a case where the processor sets the mode to the low-power mode, the processor sets the mode to: a first low-power mode as the low-power mode, in which the charge IC is driven at a first SW frequency, in a case where the charge IC works to charge the battery; and a second low-power mode as the low-power mode, in which the charge IC is driven at a second SW frequency lower than the first SW frequency, in a case where the charge IC stops the charge of the battery.

The printer drives the charge IC at the second SW frequency in the second low-power mode. Since the second SW frequency is lower than the first SW frequency, the printer can realize power saving in the second low-power mode, as compared to the first low-power mode.

In the low-power mode, a controller configured to execute control of the printing unit may be driven at a first clock frequency, the processor may set the mode of the printer to a specific mode in which the controller is driven at a second clock frequency lower than the first clock frequency, and the second SW frequency in the second low-power mode may be identical to an SW frequency of the charge IC in the specific mode. In the printer, since the second SW frequency in the second low-power mode is the same as the SW frequency in the specific mode, power saving can be realized.

The processor may switch the mode from the first low-power mode to the second low-power mode, in a case where the charge of the battery by the charge IC in the first low-power mode is completed. The printer can determine the completion of charging the battery in the first low-power mode and automatically execute power saving.

The processor may set the mode of the printer to a standby mode in which total power consumption of the printer is lower than that in the print mode and higher than that in the low-power mode, in a state that the printing unit stops printing, and in a case where the processor switches the mode from the standby mode to the low-power mode, the processor may switch the mode from the standby mode to: the first low-power mode in a case where a first predetermined time elapses in a state that the charge IC works to charge the battery, in the standby mode; and the second low-power mode in a case where a second predetermined time elapses in a state that the charge IC stops the charge of the battery, in the standby mode. When the predetermined time elapses in the standby mode, the printer can execute power saving, depending on whether the battery is being charged.

The processor may switch the mode from the print mode to the second low-power mode, in a case where the printing unit stops printing and the charge IC stops the charge of the battery in the print mode. Since the printer directly switches the mode from the print mode to the second low-power mode, power saving can be realized automatically.

In the low-power mode, a controller configured to execute control of the printing unit may be driven at a clock frequency lower than that in the print mode. By controlling the clock frequency, the printer can reduce the power consumption that is consumed in each mode.

A printer 1 in accordance with an embodiment of the present disclosure will be described with reference to the drawings. In the below, the left lower, the right upper, the left upper, the right lower, the upper, and the lower of FIG. 1 are referred to as the front, the rear, the left, the right, the upper, and the lower of the printer 1, respectively.

Figure 1:
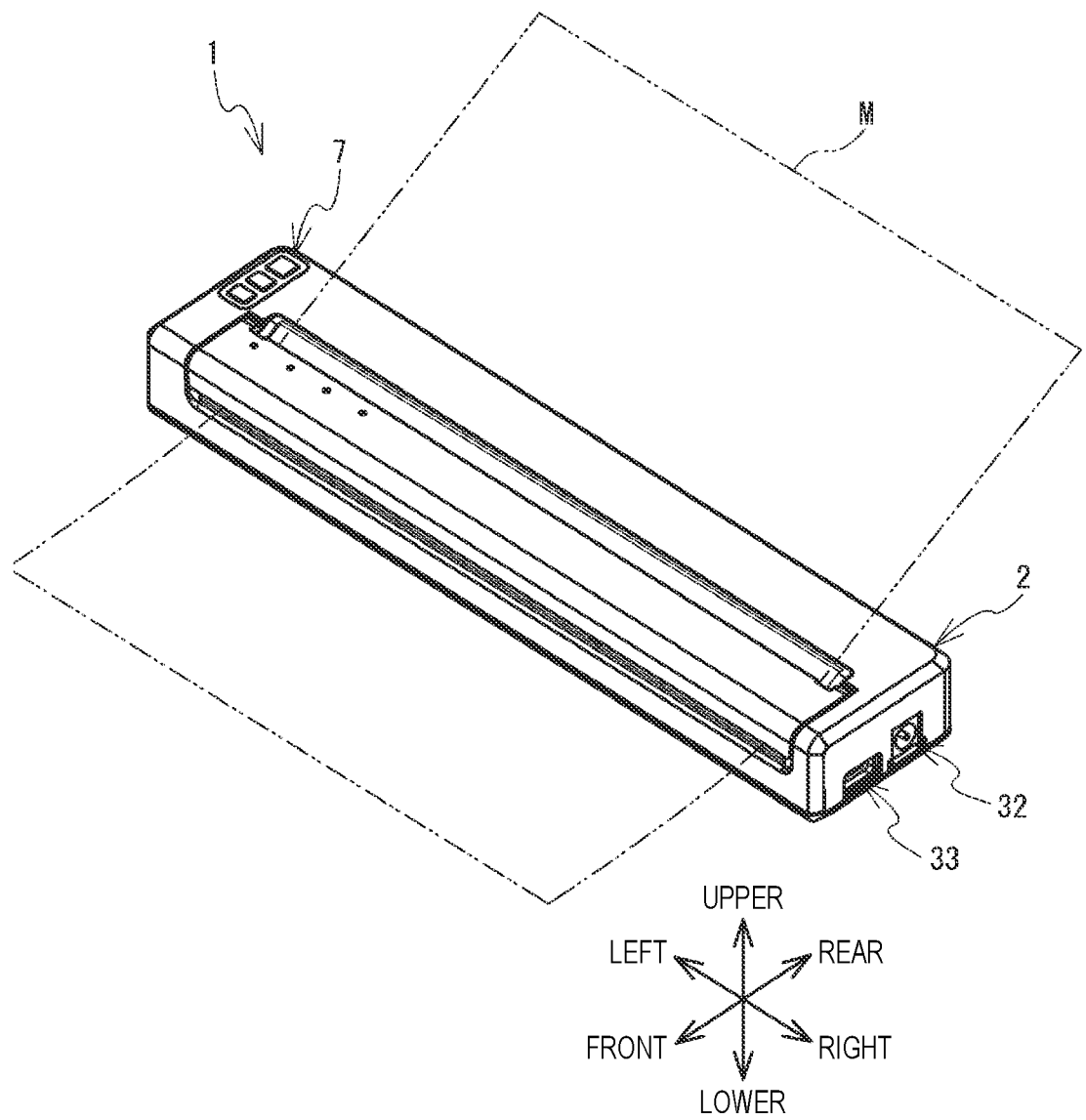
FIG. 1 is a perspective view of a printer 1.
Figure 2:
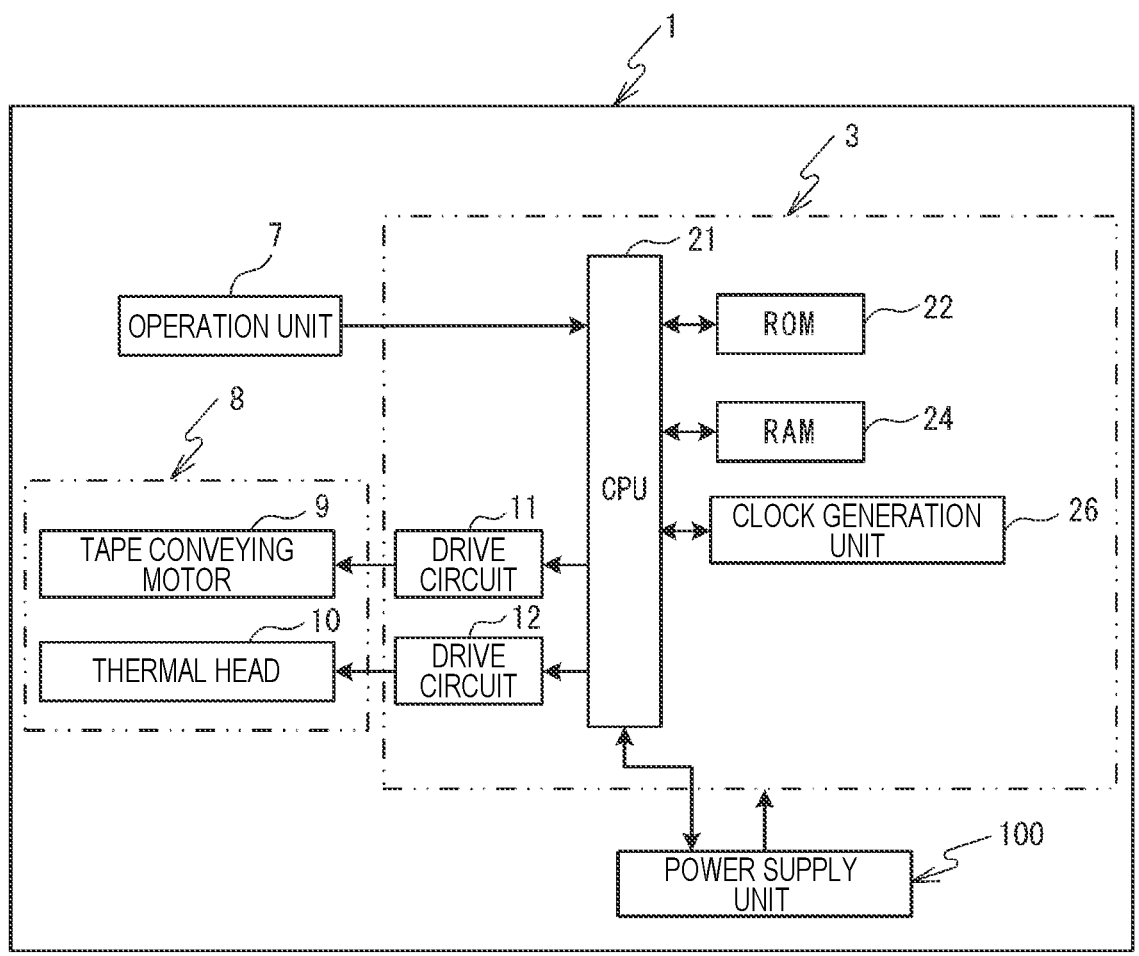
FIG. 2 shows an electrical configuration of the printer 1.
Figure 3:
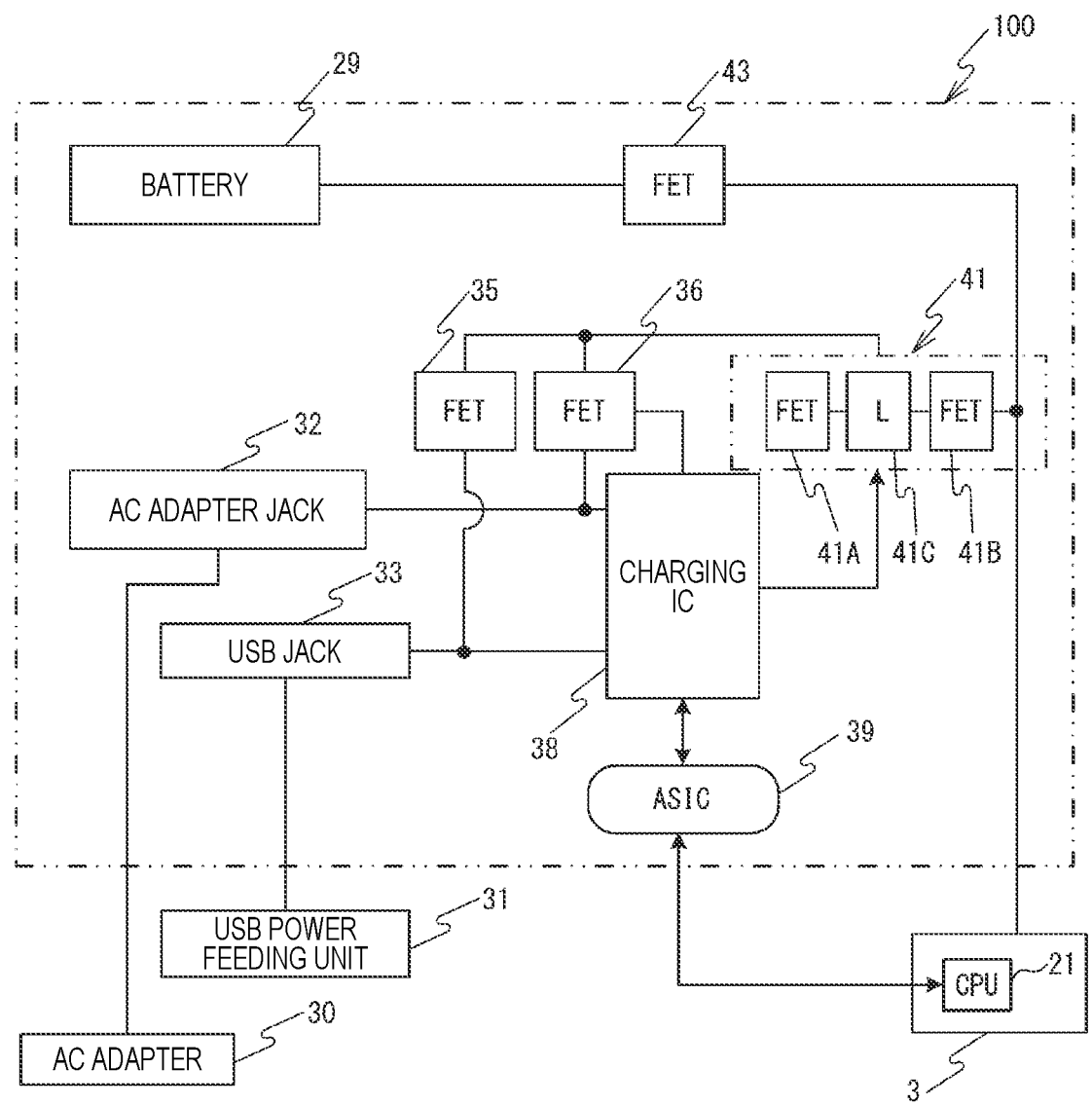
FIG. 3 is a block diagram showing a power supply unit 100 of the printer 1.

The printer 1 shown in FIGS. 1 to 3 is configured to be driven by a power supply to a printing system 3 from a power supply unit 100. The printer 1 can print an image on a medium M, based on print data. The medium M is not limited to a specific medium, but has, for example, a sheet or tape shape, and in the present embodiment, is a thermosensitive type cut sheet.

As shown in FIG. 1, the printer 1 has a case 2. The case 2 has a cuboid shape and is longer in a right and left direction than in a front and rear direction and in an upper and lower direction. A mounting unit (not shown) is provided at a rear lower part of the case 2. A battery 29 (refer to FIG. 3) is mounted to the mounting unit. An AC adapter jack 32 and a USB jack 33 are provided at a right end portion of the case 2. The USB jack 33 is provided in front of the AC adapter jack 32. An AC adapter 30 (refer to FIG. 3) is connected to the AC adapter jack 32. A USB power feeding unit 31 (refer to FIG. 3) is connected to the USB jack 33.

An operation unit 7 is provided at a left end portion of the case 2. The operation unit 7 is physical buttons for inputting various instructions. The operation unit 7 may be configured by a dial, a touch panel or the like as long as it can input various instructions.

An electrical configuration of the printer 1 is described with reference to FIG. 2. The printer 1 includes a power supply unit 100, a printing system 3, a printing unit 8, and the operation unit 7. The power supply unit 100 is configured to supply power to the printing system 3. The printing system 3 includes a CPU 21, a ROM 22, a RAM 24, a clock generation unit 26, and drive circuits 11 and 12.

The ROM 22, the RAM 24, the clock generation unit 26, and the drive circuits 11 and 12 are electrically connected to the CPU 21, respectively. In the ROM 22, various programs necessary for controlling the printer 1 are stored. The CPU 21 is configured to perform various computations, based on the programs. The RAM 24 is provided with a storage area. In the storage area, a variety of computation data is stored.

The clock generation unit 26 is configured to generate a system clock for driving the CPU 21. Clock frequencies of the system clock are 145 MHz, 48 MHz and 0 MHz. The drive circuits 11 and 12 are each an electronic circuit for driving the printing unit 8.

The printing unit 8 is provided in the case 2. The printing unit 8 includes a tape conveying motor 9 and a thermal head 10. The tape conveying motor 9 is connected to the drive circuit 11 and is configured to convey the medium M by drive of the drive circuit 11. The thermal head 10 includes a plurality of heating elements. The thermal head 10 is connected to the drive circuit 12 and is configured to selectively heat the plurality of heating elements by drive of the drive circuit 11. The CPU 21 is configured to drive the tape conveying motor 9 and the thermal head 10 by the drive circuits 11 and 12, respectively, thereby executing printing on the medium M. The operation unit 7 is connected to the CPU 21 and is configured to transmit various instructions to the CPU 21.

The power supply unit 100 is described with reference to FIG. 3. The power supply unit 100 includes a battery 29, an AC adapter jack 32, a USB jack 33, a battery charger (hereinafter, referred to as 'charge IC 38'), a switching element 41, and an application specific integrated circuits ('hereinafter, referred to as 'ASIC 39'). The power supply unit 100 is configured to supply power to the printing system 3, based on power of any one of the battery 29, the AC adapter 30 and the USB power feeding unit 31.

The battery 29 can output a voltage of 10.8V. The AC adapter 30 as an external power supply is connected to the AC adapter jack 32. The AC adapter 30 can output a voltage of 15V. The USB power feeding unit 31 as an external power supply is connected to the USB jack 33. The USB power feeding unit 31 can output a voltage of 4.75V to 5.25V.

The charge IC 38 is a device configured to step-up/step-down an input voltage from the AC adapter 30 or the USB power feeding unit 31 to 10.8V. The charge IC 38 is configured to step-down the input voltage from the AC adapter 30 to 10.8V. The charge IC 38 is configured to step-up the input voltage from the USB power feeding unit 31 to 10.8V. Note that, the charge IC 38 can charge the battery 29 by supplying power.

The switching element 41 includes two FETs 41A and 41B and an inductor 41C. Hereinafter, FET indicates a field effect transistor. The inductor 41C is a coil. One end of the inductor 41C is connected to the FET 41A. The other end of the inductor 41C is connected to the FET 41B. The FETs 41A and 41B are turned on and off under control of the ASIC 39. A frequency of turning on and off the FETs 41A and 41B is called an SW frequency. The inductor 41C is configured to accumulate energy corresponding to the supplied power. The inductor 41C is configured to repeat accumulation and release of the energy by on and off of the FET 41A and the FET 41B.

The ASIC 39 is configured to control the power supply unit 100. The ASIC 39 is configured to control the SW frequencies of the FETs 41A and 41B of the switching element 41 by controlling voltages to gates. The ASIC 39 is configured to turn on and off the FETs 35, 36, 41A, 41B and 43 by controlling the voltages to the gates.

At the time of drive by the AC adapter 30, there are a case where power is supplied to only the printing system 3 and a case where power is supplied to the printing system 3 and the battery 29 is charged. At the time of drive by the USB power feeding unit 31, there are a case where power is supplied to only the printing system 3 and a case where power is supplied to the printing system 3 and the battery 29 is charged. At the time of drive by the battery 29, the power of the battery 29 is supplied to the printing system 3 of the printer 1.

At the time of drive by the AC adapter 30, a case where power is supplied to only the printing system 3 is described. In this case, the power of the AC adapter 30 is supplied to the charge IC 38. The charge IC 38 steps-down the voltage of 15V from the AC adapter 30 to 10.8V. The ASIC 39 controls the SW frequencies of the FETs 41A and 41B of the switching element 41. The ASIC 39 turns on the FET 36. The ASIC 39 turns off the FETs 35 and 43. Thereby, the power that is output by the charge IC 38 is supplied to only the printing system 3 via the switching element 41.

At the time of drive by the AC adapter 30, a case where power is supplied to only the printing system 3 and the battery 29 is charged is described. In this case, the power of the USB power feeding unit 31 is supplied to the charge IC 38. The charge IC 38 steps-down the voltage of 15V from the AC adapter 30 to 10.8V. The ASIC 39 controls the SW frequencies of the FETs 41A and 41B of the switching element 41. The ASIC 39 turns on the FETs 36 and 43. The ASIC 39 turns off the FET 35. Thereby, the power that is output by the charge IC 38 is supplied to the printing system 3 and the battery 3 via the switching element 41. Therefore, the printer 1 charges the battery 29 while supplying power to the printing system 3.

At the time of drive by the USB power feeding unit 31, a case where power is supplied to only the printing system 3 is described. In this case, the power of the USB power feeding unit 31 is supplied to the charge IC 38. The charge IC 38 steps-up the voltage of 4.75V to 5.25V from the USB power feeding unit 31 to 10.8V. The ASIC 39 controls the SW frequencies of the FETs 41A and 41B of the switching element 41. The ASIC 39 turns on the FET 35. The ASIC 39 turns off the FETs 36 and 43. Thereby, the power that is output by the charge IC 38 is supplied to only the printing system 3 via the switching element 41.

At the time of drive by the USB power feeding unit 31, a case where power is supplied to the printing system 3 and the battery 29 is charged is described. In this case, the power of the USB power feeding unit 31 is supplied to the charge IC 38. The charge IC 38 steps-up the voltage of 4.75V to 5.25V from the USB power feeding unit 31 to 10.8V. The ASIC 39 controls the SW frequencies of the FETs 41A and 41B of the switching element 41. The ASIC 39 turns on the FETs 35 and 43. The ASIC 39 turns off the FET 36. Thereby, the power that is output by the charge IC 38 is supplied to the printing system 3 and the battery 3 via the switching element 41. Therefore, the printer 1 charges the battery 29 while supplying power to the printing system 3.

At the time of drive by the battery 29, a case where the power of the battery 29 is supplied to the printing system 3 of the printer 1 is described. In this case, the ASIC 39 turns on the FET 43. The ASIC 39 turns off the FETs 41A and 41B of the switching element 41 and the FETs 35 and 36. Thereby, the power from the battery 29 is supplied to only the printing system 3.

When causing the printing unit 8 to execute printing on the medium M, the printer 1 drives the printing unit 8. For this reason, the power that is required by the printing system 3 is larger, as compared to a case where the printing unit 8 is not driven. Therefore, the printer 1 turns off the FET 43 at the time of drive by the AC adapter 30 or the USB power feeding unit 31 and when the printing unit 8 is driven to execute printing. Thereby, the printer 1 does not charge the battery 29.

Figure 4:
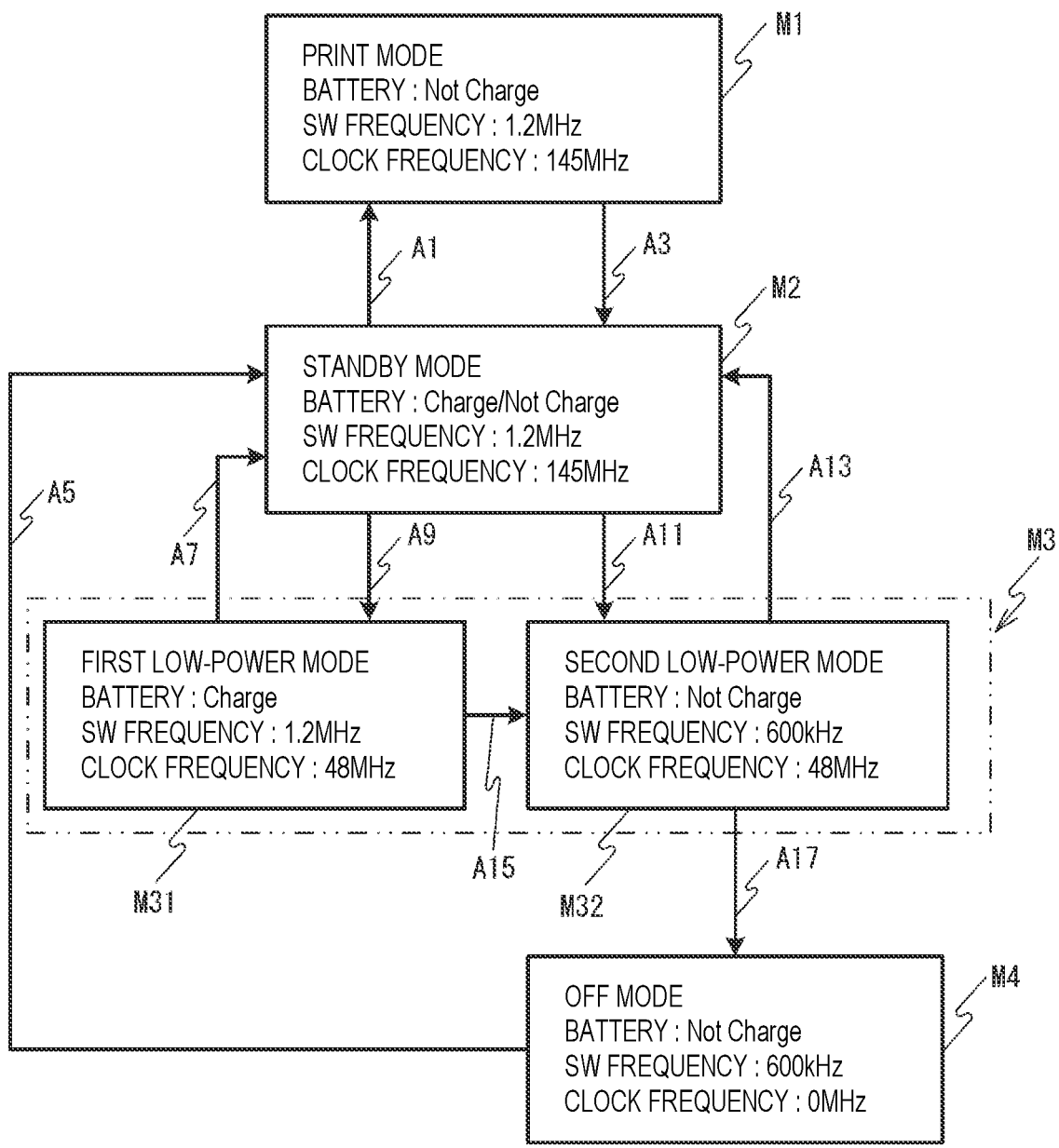
FIG. 4 is a state transition diagram of the printer 1 in each mode.

Each mode of the printer 1 is described with reference to FIG. 4. The printer 1 sets a mode of the printer 1 to any one of a print mode M1, a standby mode M2, a low-power mode M3, and an off mode M4. In the print mode M1, the printer 1 executes printing on the medium M by the printing unit 8. In this case, the charging of the battery 29 is stopped. The charge IC 38 is driven at a third SW frequency. The third SW frequency is 1.2 MHz. The first and second SW frequencies will be described later. The CPU 21 is driven at a third clock frequency. The third clock frequency is 145 MHz. The first and second clock frequencies will be described later.

The third SW frequency is the fastest frequency that can be set based on the specification of the charge IC 38. The third clock frequency is the fastest frequency that can be set based on the specification of the CPU 21. Since the printing unit 8 is driven, the total power consumption of the printer 1 in the print mode M1 is the highest among the respective modes.

In the standby mode M2, the printer 1 stands by so that printing by the printing unit 8 can be started promptly. In the standby mode M2, there are a case where the battery 29 is charged by the charge IC 38 and a case where the charging is stopped. The charge IC 38 is driven at a fourth SW frequency. The fourth SW frequency is the same as the third SW frequency. That is, the fourth SW frequency is 1.2 MHz. The CPU 21 is driven at a fourth clock frequency. The fourth clock frequency is the same as the third clock frequency. That is, the fourth clock frequency is 145 MHz. In the standby mode M2, the printing unit 8 is not driven, unlike the print mode M1. For this reason, in the standby mode M2, the total power consumption of the printer 1 is lower than that in the print mode M1.

In the low-power mode M3, the printer 1 drives the CPU 21 at a first clock frequency. The first clock frequency is lower than the third clock frequency and the fourth clock frequency, respectively. The first clock frequency is 48 MHz. For this reason, in the low-power mode M3, the total power consumption of the printer 1 is lower than that in the print mode M1 and the standby mode M2. The low-power mode M3 includes two modes, a first low-power mode M31 and a second low-power mode M32.

In the first low-power mode M31, the battery 29 is charged. The charge IC 38 is driven at a first SW frequency. The first SW frequency is the same as the third and fourth SW frequencies. That is, the first SW frequency is 1.2 MHz.

In the second low-power mode M32, the charging of the battery 29 is stopped. In this case, it is not necessary to supply power to the battery 29. The SW frequency of the charge IC 38 is set to a second SW frequency. The second SW frequency is lower than the fourth SW frequency in the standby mode M2 and the first SW frequency in the first low-power mode M31. The second SW frequency is 600 kHz. Note that, the second SW frequency is the lowest frequency based on the specification of the charge IC 38. The second SW frequency in the second low-power mode M32 is the same as a fifth SW frequency in the off mode M4 described later.

The first clock frequency in the second low-power mode M32 is the same as the first clock frequency in the first low-power mode M31. Note that, the second SW frequency in the second low-power mode M32 is lower than the first SW frequency in the first low-power mode M31. Therefore, in the second low-power mode M32, the total power consumption of the printer 1 is lower than that in the first low-power mode M31.

The off mode M4 is a state that the power is not input to the printer 1. In the off mode M4, the printer 1 uses only the minimum necessary functions. The minimum necessary function is, for example, a function of an internal clock. In the off mode M4, the charging of the battery 29 is stopped. The charge IC 38 is driven at a fifth SW frequency. The fifth SW frequency is 600 kHz. The CPU 21 is driven at a second clock frequency. The second clock frequency is lower than the first clock frequency in the second low-power mode M32. The second clock frequency is 0 MHz.

The fifth SW frequency in the off mode M4 is the same as the second SW frequency in the second low-power mode M32. Note that, the second clock frequency in the off mode M4 is lower than the first clock frequency in the second low-power mode M32. Note that, in the off mode M4, since the second clock frequency is 0 MHz, the clock is not supplied to the CPU 21. Therefore, in the off mode M4, the power consumption is lower than that in the second low-power mode M32, and the power consumption of the printer 1 is the lowest among the respective modes M1 to M4.

Figure 5:
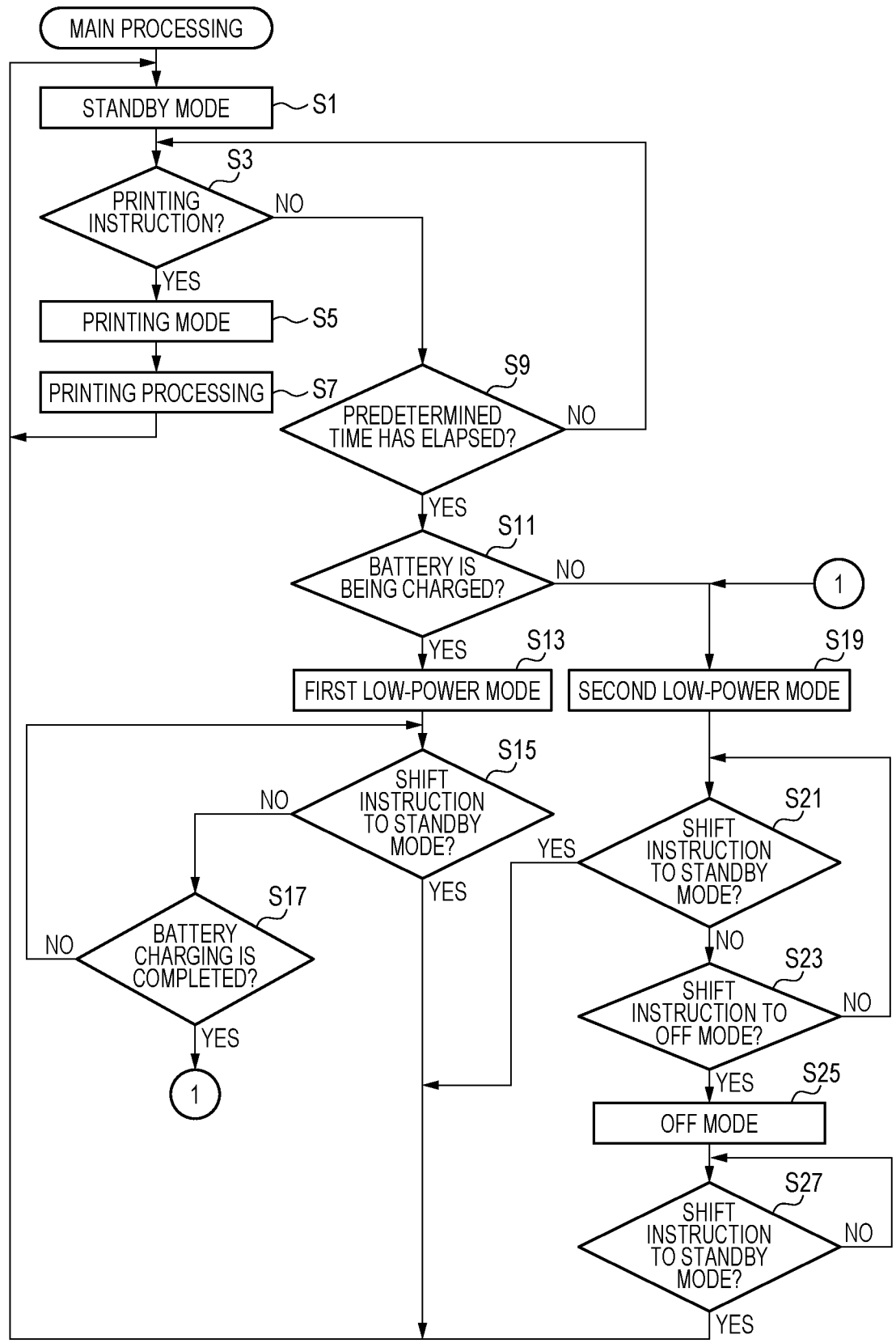
FIG. 5 is a flowchart showing main processing.

The main processing is described with reference to FIG. 5. As described above, when the power is not input to the printer 1, the mode of the printer 1 is set to the off mode M4. Note that, it is assumed that the printer 1 is driven by the AC adapter 30 or the USB power feeding unit 31. When the power is input to the printer 1 by a user's operation on the operation unit 7, the CPU 21 reads a program from the ROM 22 and executes the main processing. When the main processing is executed, the CPU 21 switches the mode of the printer 1 from the off mode M4 to the standby mode M2 (S1) (refer to an arrow A5 in FIG. 4).

Here, "setting the mode of the printer 1" means "storing the setting state of the mode of the printer 1 in the RAM 24". In this case, the clock generation unit 26 sets a clock frequency for driving the CPU 21, according to the setting state of the mode stored in the RAM 24. The CPU 21 causes the ASIC 39 to control the power supply unit 100 in each mode, according to the setting state of the mode stored in the RAM 24. In this case, the ASIC 39 controls the SW frequency of the switching element 41 and the on/off of the FETs 35, 36 and 43, according to the control by the CPU 21.

The CPU 21 determines whether a printing instruction is received (S3). When it is determined that the printing instruction is received (S3: YES) the CPU 21 switches the mode of the printer 1 from the standby mode M2 to the print mode M1 (S5) (refer to an arrow A1 in FIG. 4). The CPU 21 executes printing processing on the medium M by the printing unit 8 (S7). After the printing is completed, the CPU 21 returns the processing to the processing of S1, and switches the mode of the printer 1 from the print mode M1 to the standby mode M2 (refer to an arrow A3 in FIG. 4).

When the printing instruction is not received (S3: NO), the CPU 21 determines whether a predetermined time has elapsed since the standby mode M2 was set (S9). The predetermined time is 3 minutes, as an example. When it is determined that the predetermined time has not elapsed (S9: NO), the CPU 21 maintains the standby mode M2 and returns the processing to S3.

When it is determined that the predetermined time has elapsed (S9: YES), the CPU 21 determines whether the battery 29 is being charged by the charge IC 38 (S11). When it is determined that the battery 29 is being charged by the charge IC 38 (S11: YES), the CPU 21 switches the mode of the printer 1 from the standby mode M2 to the first low-power mode M31 (S13) (refer to an arrow A9 in FIG. 4). That is, the CPU 21 sets to the first low-power mode M31 when a predetermined time elapses in a state that the charge IC 38 works to charge the battery 29, in the standby mode M2.

On the other hand, when it is determined that the charging of the battery 29 by the charge IC 38 is stopped (S11: NO), the CPU 21 switches the mode of the printer 1 from the standby mode M2 to the second low-power mode M32 (S19) (refer to an arrow A11 in FIG. 4). That is, the CPU 21 sets to the second low-power mode M32 when a predetermined time elapses in a state that the charge IC 38 stops the charge of the battery 29, in the standby mode M2. The processing after S19 will be described later.

In the first low-power mode M31, the CPU 21 determines whether a shift instruction to the standby mode M2 is received (S15). The shift instruction is transmitted to the CPU 21 when the operation unit 7 is operated by the user. The operation of the operation unit 7 means that a power supply button is pressed or a print start button is pressed.

When it is determined that the shift instruction to the standby mode M2 is received (S15: YES) the CPU 21 returns the processing to S1, switches the mode of the printer 1 from the first low-power mode M31 to the standby mode M2 (refer to an arrow A7 in FIG. 4). Note that, when the print start button is pressed, the printer 1 shifts to the print mode M1 via the standby mode M2 (S5, S7).

When the shift instruction to the standby mode M2 is not received (S15: NO), the CPU 21 determines whether the charging of the battery 29 by the charge IC 38 is completed in the first low-power mode M31 (S17). When it is determined that the charging of the battery 29 by the charge IC 38 is not completed (S17: NO), the CPU 21 maintains the first low-power mode M31 and returns the processing to S15.

When it is determined that the charging of the battery 29 by the charge IC 38 is completed in the first low-power mode M31 (S17: YES), the CPU 21 switches the mode of the printer 1 from the first low-power mode M31 to the second low-power mode M32 (S19) (refer to an arrow A15 in FIG. 4).

The CPU 21 determines whether the shift instruction to the standby mode M2 is received in the second low-power mode M32 (S21). The shift instruction is transmitted to the CPU 21 when the operation unit 7 is operated by the user. The operation of the operation unit 7 means that the power supply button is pressed or the print start button is pressed. When it is determined that the shift instruction to the standby mode M2 is received (S21: YES), the CPU 21 returns the processing to S1, switches the mode of the printer 1 from the second low-power mode M32 to the standby mode M2 (refer to an arrow A13 in FIG. 4).

When the shift instruction to the standby mode M2 is not received (S21: NO), the CPU 21 determines whether a shift instruction to the off mode M4 is received (S23). The shift transition is transmitted to the CPU 21 when the operation unit 7 is operated by the user or when a predetermined time elapses without the user's operation on the operation unit 7. The operation of the operation unit 7 means turning off the power supply switch. The predetermined time in S23 is longer than the predetermined time in S9. The predetermined time in S23 is one hour.

When it is determined that the shift instruction to the off mode M4 is not received (S23: NO), the CPU 21 maintains the second low-power mode M32 and returns the processing to S21. When it is determined that the shift instruction to the off mode M4 is received (S23: YES), the CPU 21 switches the mode of the printer 1 from the second low-power mode M32 to the off mode M4 (S25) (refer to an arrow A17 in FIG. 4).

The CPU 21 determines whether a shift instruction from the off mode M4 to the standby mode M2 is received (S27). The shift instruction is transmitted to the CPU 21 when the operation unit 7 is operated by the user. The operation of the operation unit 7 means that the power supply button is pressed or the print start button is pressed.

When it is determined that the shift instruction to the standby mode M2 is not accepted (S27: NO), the CPU 21 maintains the off mode M4, returns the processing to S27, and stands by. When it is determined that the shift instruction to the standby mode M2 is received (S27: YES), the CPU 21 returns the processing to S1, switches the mode of the printer 1 from the off mode M4 to the standby mode M2 (refer to an arrow A5 in FIG. 4).

As described above, the CPU 21 sets the mode of the printer 1 to the low-power mode M3 in which the total power consumption of the printer 1 is lower than that in the print mode M1, in the state that the printing unit 8 stops printing. When the charge IC 38 works to charge the battery 29, the CPU 21 sets the mode of the printer 1 to the first low-power mode M31 as the low-power mode M3, in which the charge IC 38 is driven at the first SW frequency. When the charge IC 38 stops the charge of the battery 29, the CPU 21 sets the mode of the printer 1 to the second low-power mode M32 as the low-power mode M3, in which the charge IC 38 is driven at the second SW frequency lower than the first SW frequency.

The printer 1 drives the charge IC 38 at the second SW frequency in the second low-power mode M32. Since the second SW frequency is lower than the first SW frequency, the printer 1 can realize power saving in the second low-power mode M32, as compared to the first low-power mode M31. Further, when the printer 1 tries to realize power saving without changing the SW frequency, it is necessary to increase a size of the switching element 41 of the charge IC 38. In contrast, since the printer 1 tries to realize power saving by changing the SW frequency, it is possible to prevent the increase in size of the switching element 41.

The low-power mode M3 is a mode in which the CPU 21 executing the control of the printing unit 8 is driven at the first clock frequency. The CPU 21 sets the mode of the printer 1 to the off mode M4 in which the CPU 21 is driven at the second clock frequency lower than the first clock frequency. The second SW frequency in the second low-power mode M32 is the same as the fifth SW frequency of the charge IC 38 in the off mode M4. In the printer 1, since the second SW frequency in the second low-power mode M32 is the same as the fifth SW frequency in the off mode M4, power saving can be realized.

When the charge of the battery 29 by the charge IC 38 in the first low-power mode M31 is completed, the CPU 21 switches the mode from the first low-power mode M31 to the second low-power mode M32. The printer 1 can determine the completion of the charging of the battery 29 in the first low-power mode M31 and automatically execute power saving.

The CPU 21 sets the mode of the printer 1 to the standby mode M2 in which the total power consumption of the printer 1 is lower than that in the print mode M1 and higher than that in the low-power mode M3, in the state that the printing unit 8 stops printing. In the standby mode M2, when a predetermined time elapses in the state that the charge IC 38 works to charge the battery 29, the CPU 21 switches the mode from the standby mode M2 to the first low-power mode M31. In the standby mode M2, when a predetermined time elapses in the state that the charge IC 38 stops the charge of the battery 29, the CPU 21 switches the mode from the standby mode M2 to the second low-power mode M32. When the predetermined time elapses in the standby mode M2, the printer 1 can execute power saving, depending on whether the battery 29 is being charged.

In the low-power mode M3, the CPU 21 configured to execute the control of the printing unit 8 is driven at the first clock frequency lower than that in the print mode M1. By controlling the clock frequency, the printer 1 can reduce the power consumption that is consumed in each mode.

In the above embodiment, the CPU 21 corresponds to the 'controller' of the present disclosure. The off mode M4 corresponds to the 'specific mode' of the present disclosure. 3 minutes correspond to the 'first predetermined time' of the present disclosure. 3 minutes correspond to the 'second predetermined time' of the present disclosure. The CPU 21 that executes the processing of S1, S5, S13, S19 and S25 corresponds to the 'processor' of the present disclosure.

Figure 6:
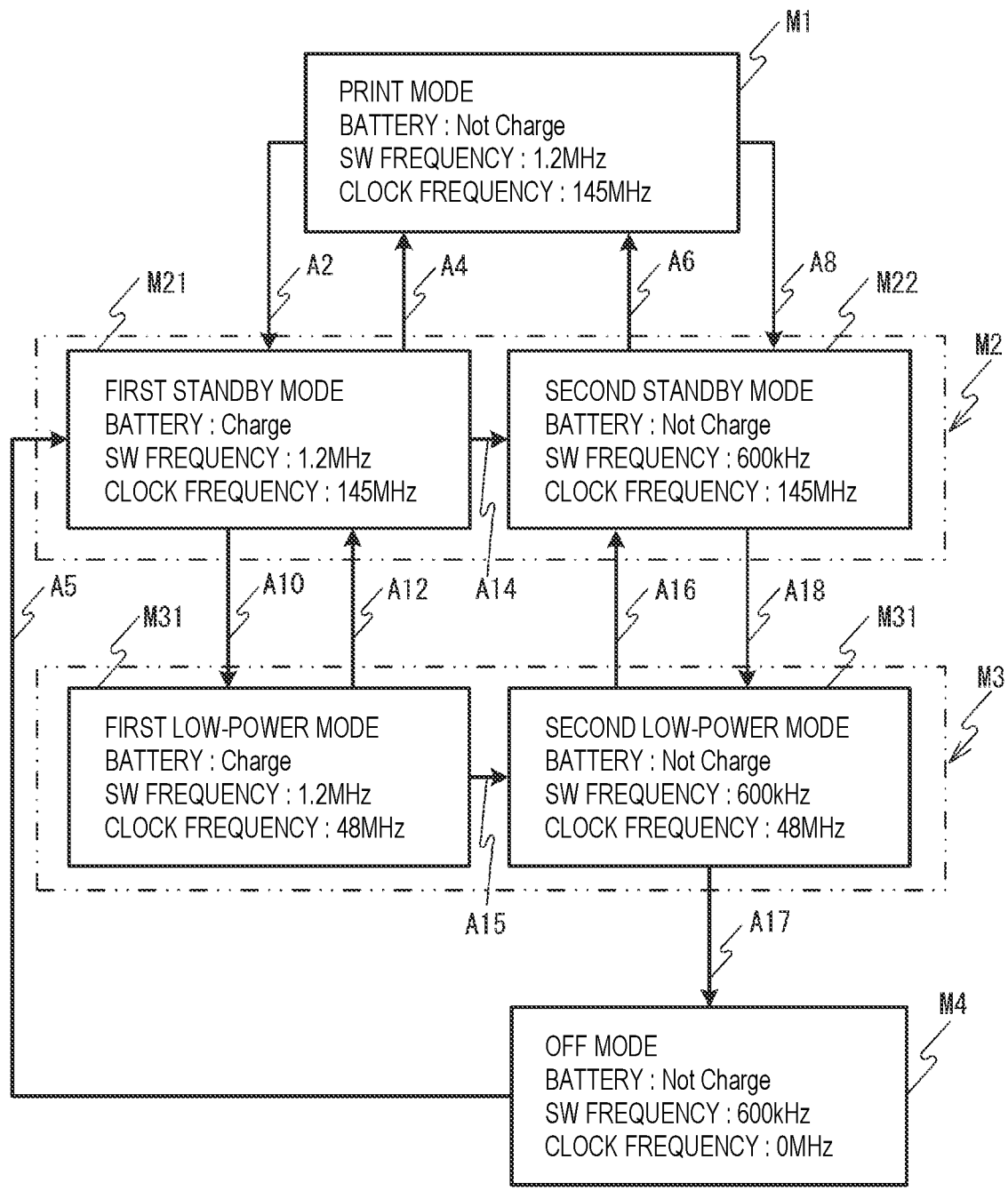
FIG. 6 is a state transition diagram of the printer 1 in each mode.

A state transition diagram of a modified embodiment of the present disclosure is described with reference to FIG. 6. In the description below, the same parts as those in the above embodiment are denoted with the same reference numerals, and different parts are mainly described. The modified embodiment is different from the above embodiment, in that the standby mode M2 has a first standby mode M21 and a second standby mode M22.

In the standby mode M2, the printer 1 stands by so that printing by the printing unit 8 can be started promptly. The CPU 21 is driven at a fifth clock frequency. The fifth clock frequency is the same as the fourth clock frequency in the standby mode M2 of the above embodiment. That is, the fifth clock frequency is 145 MHz. The standby mode M2 has a first standby mode M21 and a second standby mode M22.

In the first standby mode M21, the battery 29 is being charged. The charge IC 38 is driven at a sixth SW frequency. The sixth SW frequency is the same as the fourth SW frequency in the standby mode M2 of the above embodiment. That is, the sixth SW frequency is 1.2 MHz. Therefore, the first standby mode M21 corresponds to the case where the battery 29 is being charged in the standby mode M2 of the above embodiment.

In the second standby mode M22, the charging of the battery 29 is stopped. The charge IC 38 is driven at a seventh SW frequency. The seventh SW frequency is the same as the second SW frequency in the second low-power mode M32 of the above embodiment. That is, the seventh SW frequency is 600 kHz.

The fifth clock frequency in the second standby mode M22 is the same as the fifth clock frequency in the first standby mode M21. The seventh SW frequency in the second standby mode M22 is lower than the sixth SW frequency in the first standby mode M21. Therefore, the total power consumption of the printer 1 is lower in the second standby mode M22, as compared to the first standby mode M21.

The seventh SW frequency in the second standby mode M22 is the same as the second SW frequency in the second low-power mode M32. Note that, the fifth clock frequency in the second standby mode M22 is higher than the first clock frequency in the second low-power mode M32. Therefore, in the second low-power mode M32, the total power consumption of the printer 1 is lower than that in the second standby mode M22.

The print mode M1 and the first standby mode M21 shift to each other (refer to arrows A2 and A4). It is assumed that a shift condition is the same as the case of the shift from the print mode M1 to the standby mode M2 in the embodiment. The print mode M1 and the second standby mode M22 shift to each other (refer to arrows A6 and A8). It is assumed that a shift condition is the same as the case of the shift from the print mode M1 to the standby mode M2 in the embodiment.

The first standby mode M21 shifts to the second standby mode M22 (refer to an arrow A14). A shift condition is that the charging of the battery 14 is completed. The first standby mode M21 and the first low-power mode M31 shift to each other (refer to arrows A10 and A12). It is assumed that a shift condition is the same as the case of the shift from the standby mode M2 to the first low-power mode M31 in the embodiment. The second standby mode M22 and the second low-power mode M32 shift to each other (refer to arrows A16 and A18). It is assumed that a shift condition is the same as the case of the shift from the standby mode M2 to the second low-power mode M32 in the embodiment.

By the above, when the printing unit 8 stops printing and the charging of the battery 29 stops in the print mode M1, the printer 1 switches the mode from the print mode M1 to the second low-power mode M32 (refer to an arrow A8). Thereby, since the printer 1 directly switches the mode from the print mode M1 to the second low-power mode M32, power saving can be automatically realized.

The present disclosure can be changed from the above embodiment. The printer 1 performs printing on the thermosensitive cut sheet, but is not limited thereto. For example, the printer 1 may be a thermal transfer type printer or an inkjet printer.

The printer is driven by the three power sources of the battery 29, the AC adapter 30 and the USB power feeding unit 31, but is not limited thereto. For example, one of the AC adapter 30 and the USB power feeding unit 31 may be omitted.

The voltage that is output by each of the battery 29, the AC adapter 30 and the USB power feeding unit 31 may be appropriately changed. The voltage that is output by the charge IC 38 is not limited to the above embodiment and may be appropriately changed. The SW frequency of the charge IC 38 may be accordingly changed as appropriate.

The charge IC 38 is provided in the printer 1, but is not limited thereto. The charge IC 38 may be provided outside the printer 1, for example, to supply power to the battery 29 and the printing system 3. The battery 29 is provided in the printer 1, but is not limited thereto. The battery 29 may be detachably mounted to the case 2. The battery 29 may also be provided outside the printer 1.

The shift destination to each mode is not limited to the above embodiment, and may be appropriately changed. For example, when the print start button is pressed in the off mode M4, the mode is shifted from the off mode M4 to the standby mode M2 and is then shifted to the print mode M1 but may also be directly shifted from the off mode M4 to the print mode M1.

The clock frequency set in each mode may be changed as appropriate. The third clock frequency in the print mode M1 and the fourth clock frequency in the standby mode M2 are 145 MHz, but is not limited thereto. These clock frequencies may also be higher or lower than 145 MHz.

The first clock frequency in the low-power mode M3 is 48 MHz, but is not limited thereto, and may also be set higher or lower than 48 MHz. The second clock frequency in the off mode M4 may not be 0 MHz. In this case, the second clock frequency may be lower than the first clock frequency in the low-power mode M3.

In the first low-power mode M31 and the second low-power mode M32, the clock frequencies are the same as the first clock frequency but may also be different. The clock frequency in the second low-power mode M32 may also be lower than the first clock frequency in the first low-power mode M31.

The switching frequency of the charge IC 38 set in each mode may be appropriately changed. For example, the first SW frequency in the first low-power mode M31 may be set equal to or higher or lower than 1.2 MHz. In addition, the second SW frequency in the second low-power mode M32 may be set higher or lower than 600 kHz.

The predetermined time until the mode is shifted from the standby mode M2 to the low-power mode M3 is 3 minutes, but is not limited thereto. The predetermined time may be shorter or longer than 3 minutes, for example. The predetermined time until the mode is shifted from the standby mode M2 to the first low-power mode M31 and the predetermined time until the mode is shifted from the standby mode M2 to the second low-power mode M32 may be different. The predetermined time may be appropriately set by the user.

The predetermined time until the mode is shifted from the second low-power mode M32 to the off mode M4 is 1 hour, but is not limited thereto. The predetermined time may be shorter or longer than 1 hour, for example. The predetermined time may be appropriately set by the user.

Note that, instead of the CPU 21, a microcomputer, an ASIC, an FPGA (Field Programmable Gate Array) and the like may also be used as the processor. The main processing may also be processed in a distributed manner by a plurality of processors. The printing system 3 may include another non-transient storage medium such as a flash memory and an HDD. The non-transient storage medium may be any storage medium capable of retaining information, regardless of a storage period of information. The non-transient storage medium may not include a transient storage medium (for example, a signal to be transmitted).

A variety of programs may be downloaded (i.e., transmitted as a transmission signal) from a server connected to a network (not shown) and stored in the flash memory, the HDD or the like, for example. In this case, the variety of programs may be preserved in a non-transient storage medium such as an HDD provided in the server.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printer comprising:
a printing unit configured to be driven by a power supply from a battery which is charged by a charge IC, the printing unit including a printing mechanism that executes printing on a medium; and
a processor configured to:
set a mode of the printer to a print mode in which the printing unit executes printing; and
set the mode of the printer to a low-power mode in which total power consumption of the printer is lower than that in the print mode, in a state that the printing unit stops printing,
wherein in a case where the processor sets the mode to the low-power mode, the processor sets the mode to:
a first low-power mode as the low-power mode, in which the charge IC is driven at a first SW frequency, in a case where the charge IC works to charge the battery; and
a second low-power mode as the low-power mode, in which the charge IC is driven at a second SW frequency lower than the first SW frequency, in a case where the charge IC stops the charge of the battery,
wherein in the low-power mode, a controller configured to execute control of the printing unit is driven at a first clock frequency, and
wherein the first clock frequency in the second low-power mode is identical to the first clock frequency in the first low-power mode.

2. The printer according to claim 1,
the processor sets the mode of the printer to a specific mode in which the controller is driven at a second clock frequency lower than the first clock frequency, and
the second SW frequency in the second low-power mode is identical to an SW frequency of the charge IC in the specific mode.

3. The printer according to claim 1,
wherein the processor switches the mode from the first low-power mode to the second low-power mode, in a case where the charge of the battery by the charge IC in the first low-power mode is completed.

4. The printer according to claim 1,
wherein the processor switches the mode from the print mode to the second low-power mode, in a case where the printing unit stops printing and the charge IC stops the charge of the battery in the print mode.

5. The printer according to claim 1,
wherein the first clock frequency is lower than that in the print mode.

6. The printer according to claim 1, the printing mechanism includes a thermal head.

7. A printer comprising:
a printing unit configured to be driven by a power supply from a battery which is charged by a charge IC, the printing unit including a printing mechanism that executes printing on a medium; and
a processor configured to:
set a mode of the printer to a print mode in which the printing unit executes printing; and
set the mode of the printer to a low-power mode in which total power consumption of the printer is lower than that in the print mode, in a state that the printing unit stops printing,
wherein in a case where the processor sets the mode to the low-power mode, the processor sets the mode to:
a first low-power mode as the low-power mode, in which the charge IC is driven at a first SW frequency, in a case where the charge IC works to charge the battery; and
a second low-power mode as the low-power mode, in which the charge IC is driven at a second SW frequency lower than the first SW frequency, in a case where the charge IC stops the charge of the battery, the processor sets the mode of the printer to a standby mode in which total power consumption of the printer is lower than that in the print mode and higher than that in the low-power mode, in a state that the printing unit stops printing, and in a case where the processor switches the mode from the standby mode to the low-power mode, the processor switches the mode from the standby mode to:
the first low-power mode in a case where a first predetermined time elapses in a state that the charge IC works to charge the battery, in the standby mode; and
the second low-power mode in a case where a second predetermined time elapses in a state that the charge IC stops the charge of the battery, in the standby mode.

8. The printer according to claim 7, the printing mechanism includes a thermal head.

* * * * *